United States Patent [19]

Awane et al.

[11] 3,928,435
[45] Dec. 23, 1975

[54] PROCESS FOR THE CONTINUOUS PRODUCTION OF HIGHLY PURE SODIUM FORMATE

[75] Inventors: Yasushi Awane, Niigata; Sadao Otsuka, Nagareyama; Masao Nagata; Fumio Tanaka, both of Niigata, all of Japan

[73] Assignee: Mitsubishi Gas Chemical Co., Ltd., Tokyo, Japan

[22] Filed: Aug. 12, 1974

[21] Appl. No.: 496,561

[30] Foreign Application Priority Data
Aug. 13, 1973 Japan.............................. 48-90052

[52] U.S. Cl. .............................................. 260/542
[51] Int. Cl.² ....................................... C07C 51/00
[58] Field of Search ................................... 260/542

[56] References Cited
UNITED STATES PATENTS

| | | | |
|---|---|---|---|
| 820,159 | 5/1906 | Weise et al. | 260/542 |
| 1,017,261 | 2/1912 | Hempel | 260/542 |
| 2,281,715 | 5/1942 | Rogers | 260/542 |

*Primary Examiner*—Vivian Garner

[57] ABSTRACT

A process for producing a highly pure sodium formate in a single step is disclosed wherein highly pure and highly concentrated aqueous solution of sodium formate is produced continuously with ease in a compact apparatus.

6 Claims, No Drawings

PROCESS FOR THE CONTINUOUS PRODUCTION OF HIGHLY PURE SODIUM FORMATE

BACKGROUND OF THE INVENTION

It is well known that sodium formate is produced by the reaction of sodium hydroxide with carbon monoxide.

This reaction is as follows:

$$NaOH + CO \rightarrow HCOONa$$

Hitherto sodium formate has been produced by high pressure reaction of sodium hydroxide solution with carbon monoxide in a batch method. By this method, however, even the use of highly pure carbon monoxide results in the product of low purity and of low concentration. And a large quantity of sodium hydroxide remains unreacted. Therefore an attempt to produce sodium formate solution has been made wherein sodium hydroxide is reacted with carbon monoxide in a counter current system in several autoclaves equipped with stirrers and connected in series. The equipment of the connected autoclaves system, however, is mechanically complicated and needs a skillful operation. Moreover, the obtained solution is of low concentration at the vicinity of 30% and of low purity with about 1% of sodium hydroxide and about 2% of sodium carbonate. Moreover, a process for concentration is necessary to obtain highly concentrated sodium formate solution, and the sodium formate solution obtained by the concentration process contains a large quantity of remaining sodium hydroxide and the purity of the resulting sodium formate solution is extremely low.

In the case of the production of sodium formate through the reaction of sodium hydroxide with carbon monoxide, it has long been accepted that, since the absorption of carbon monoxide into the sodium hydroxide solution is slow, much time is needed for the gas liquid contact and counter-current method is obviously most profitable in the continuous method. Anyway if one desires to complete the reaction so as not to contain any sodium hydroxide, the counter-current method seems to be more profitable, since the partial pressure of carbon monoxide becomes higher with lowering of the concentration of sodium hydroxide according to the proceeding of the reaction. We, the inventors attempted to produce sodium formate solution with high purity and high concentration by counter-current method in a packed tower reactor to attain enough gas-liquid contact. As the result, we came to a conclusion explained hereinafter. As flooding is often observed when a large flow of carbon monoxide against liquid flow is fed to conclude the reaction, there is a limitation about ratio of excess carbon monoxide to sodium hydroxide solution. So under the proper condition with low ratio of excess carbon monoxide not to cause flooding, the produced sodium formate solution contains a large quantity of remaining sodium hydroxide, and it is very difficult to obtain pure sodium formate solution with low sodium hydroxide concentration less than 0.1 weight %, and more difficult to obtain sodium formate solution with more than mentioned impurity concentration constantly. It is expected that at the lower part of the reaction tower sodium hydroxide scarcely remained, since the partial pressure of carbon monoxide becomes higher with lowering of the concentration of sodium hydroxide. On the contrary low temperature at the lower part of the reaction tower caused by gas feeding retards the reaction of sodium hydroxide with excess carbon monoxide. Consequently, to obtain an expected product, the reaction tower cannot help being a hugh one. This is industrially disadvantageous.

Thus we inventors have found a remarkable fact, that highly pure sodium formate with remaining sodium hydroxide concentration below 0.1% by weight is obtained by the co-current system in a tower type reactor in spite of lowering of partial pressure of carbon monoxide according to the lowering of sodium hydroxide concentration in the solution. That is to say, by employment of the co-current contact system, we have found that there are many advantages, such as extemely low remaining sodium hydroxide concentration, far easier operation of the apparatus than that of the prior art, optional gas-liquid ratio and no means such as raschig rings used for gas-liquid contact in the reaction tower.

SUMMARY OF THE INVENTION

The object of this invention is to provide a process for producing sodium formate solution of about 50% concentration and high purity containing below 0.1% of sodium hydroxide, which has been impossible industrially. By the present invention above mentioned sodium formate of high quality is produced industrially in one step and in co-current contact system.

DETAILED DESCRIPTION OF THE INVENTION

The present invention relates to a process for producing highly pure sodium formate in a single step. More particularly, it presents a process for producing continuously with ease highly pure aqueous solution of sodium formate in a tower type reactor.

The apparatus used in the present invention is tower type reactor, and preferably an empty tower. An empty tower is advantageous since high reaction velocity can be obtained, as mixing of the components is conducted effectively, which results in raising not only the flow rate per hour but also the purity of sodium formate.

It is preferable to attach an appropriate device, e.g., perforated plates, in the reactor to prevent counter mixing of the formed sodium formate, but the plate number need not be so large and the plate interval may be fairly large.

It is desirable to introduce the gas in fine bubbles as possible to make sure of the contact of the gas with sodium hydroxide and, preferably, a perforated place or other dispersion device is attached to a gas inlet. As carbon monoxide is fed excessively over sodium hydroxide, an appropriate apparatus for gas-liquid separation is equipped after gasliquid outlet.

The reaction is conducted under pressure of 12–30 Kg/cm$^2$, preferably under pressure of 15–20 Kg/cm$^2$ and at temperature of 150° – 220°C, preferably at temperature of 170° – 220°C. Lower pressure than 12 Kg/cm$^2$ and lower temperature than 150°C decrease reaction velocity and a higher temperature than 220°C is apt to cause corrosion of the apparatus.

If the excess gas separated from the sodium formate solution after the reaction contains inert gas, such as nitrogen, a part of it is purged so as to be free from the inert gas, and the remaining is recirculated to the raction tower, with supplying carbon monoxide consumed, to be reacted with sodium hydroxide. Naturally, whole amounts of the excess gas can be recirculated when 100% carbon monoxide is used.

Although the flow of sodium hydroxide may vary extensively, it is industrially preferable that the flow is less than 2 l./hr. per effective unit volume(l) to obtain 45–55% aqueous solution of sodium formate. Sodium formate of high purity shall not be obtained if the flow is more than above mentioned value. It is secure to use carbon monoxide more than 50% excess over the theoretical amount calculated from the quantity of sodium hydroxide and more than 80% excess of carbon monoxide may be used for the purpose of obtaining highly pure sodium formate solution. In case carbon monoxide is used less than 50% excess over the theoretical amount, the mixing effect by gas is reduced and reaction velocity decreases.

In the explanation hereinafter the concentration of gas is expressed in volume per cent. and those of the solution in weight percent.

It is desirable to use carbon monoxide in higher concentration as possible to reduce the amount of the gas to be purged but the concentration may be necessarily 100% if the pure gas is not available. From an economic standpoint, however, it is desirable that the concentration of carbon monoxide in the bubbling gas be above 50% and more preferably above 70%.

The reactor will become a hugh one in case the carbon monoxide of concentration less than 50% is used since the reaction velocity is decreased. Introduction of a highly concentrated sodium hydroxide solution without dilution may not lead to corrosion of the tower if the sufficient mixing is secured at the inlet plate, although it depends on corrosion resistivity of the tower material. This is a great advantage of the present invention contrasted with the counter-current method. To avoid local high concentration of sodium hydroxide, the solution may be diluted with sodium formate solution. The concentration of sodium formate in said sodium hydroxide solution is preferably 5–50%, dependent on the desired concentration of sodium formate in the final product. The fluidity of the solution decreases if sodium formate solution more than 50% concentration is used since there is a limitation on the solubility of the sodium formate to sodium hydroxide solution.

Though there is no rule in the method of preparation of a sodium hydroxide-sodium formate solution, it is practical to dilute a commercially available sodium hydroxide solution with sodium formate solution formed. In this case, a part of sodium formate solution formed is, in practice, removed and the remaining is combined with sodium hydroxide to be fed back to the reaction tower.

The following examples service to illustrate the present invention.

Example 1

To the lowest plate of a tower, made of carbon steel-pressure pipe, 4 inches in diameter, 15 m high, 95 l. in effective volume and fitted with ten perforated plates, carbon monoxide and sodium hydroxide solution containing sodium formate were fed and submitted to react under pressure. The resulting reaction solution was removed and separated from the gas. A little over 10% of the outlet gas was removed, the remaining gas was mixed with 98% carbon monoxide to give 91% CO gas and, then, recirculated to the reaction tower.

Averaged reaction conditions were as follows: Composition of the feeding liquid,
conc. of NaOH, 12.1%;
conc. of HCOONa, 34.2%.

| | |
|---|---|
| Quantity of the fed liquid, | 75 l./hr |
| Quantity treated per effective until Volume (l), | 0.79 l./hr. |
| Ratio of the quantity of used CO to the theoretical quantity, | 2.0 |
| Temperature of the lowest part, | 182°C |
| Temperature at the highest part, | 192°C |
| Pressure at the top(gauge), | 16 kg/cm$^2$ |

As the product, an aqueous solution was obtained which contained 50.5% of HCOONa and less then 0.01 NaOH. It was colorless clear solution containing practically pure sodium formate.

Example 2 – 10

By the same apparatus as in Example 1 and varied conditions listed in Table 1, practically pure aqueous sodium formate solutions were obtained in every case. The flow was 75–120 l./hr and the quantities treated per effective unit volume (l.) were 0.79–1.26 l./hr.

| | Feeding liquid | | | Ratio of used CO to the theoretical quantity | Pressure (kg/cm$^2$) | Temperature °C | | Concentration of the Product (%) | Concentration of NaOH in the Product (%) |
|---|---|---|---|---|---|---|---|---|---|
| | Concentration of CO(%) | Concentration of NaOH(%) | Concentration of HCOONa(%) | | | At the lowest part | At the top | | |
| 2 | 73 | 9.8 | 43.0 | 2.3 | 16 | 183 | 190 | 55.8 | 0.009 |
| 3 | 73 | 10.1 | 42.7 | 2.3 | 16 | 168 | 177 | 55.6 | 0.07 |
| 4 | 73 | 14.6 | 36.7 | 2.3 | 16 | 182 | 198 | 55.8 | 0.004 |
| 5 | 73 | 13.8 | 32.8 | 2.3 | 16 | 173 | 185 | 53.0 | 0.009 |
| 6 | 91 | 12.4 | 39.3 | 1.7 | 16 | 178 | 191 | 55.4 | 0.01 |
| 7 | 91 | 12.4 | 40.0 | 1.5 | 16 | 183 | 192 | 55.9 | 0.012 |
| 8 | 96 | 40.0 | 0 | 1.5 | 20 | 188 | 200 | 53.0 | 0.01 |
| 9 | 96 | 24.0 | 24.3 | 1.5 | 20 | 185 | 198 | 54.9 | 0.02 |
| 10 | 92.1 | 9.6 | 44.1 | 2.0 | 20 | 180 | 188 | 56.8 | 0.04 |

An example of the prior art explained hereunder will serve to realize the advantages of the present invention Reaction tower of 4 inches in diameter and 15 meters in height was packed with ½ inch raschig rings. Then from the top of the tower the solution consisting of 35% sodium formate and 12% of sodium hydroxide was supplied with flow rate of 60 l./hr. Carbon monoxide of 88% concentration was supplied twice as theoretical value calculated from the amount of sodium hydroxide fed from the lower part of the tower. The reaction temperature was 170°–190°C and the pressure was 16–17 Kg/cm$^2$. The product obtained was sodium formate solution of 50% concentration with sodium hydroxide up to 2%.

What is claimed:

1. In a process for continuous production of sodium formate solution by reaction between an aqueous sodium hydroxide solution and excessive carbon monoxide under pressure in a tower type reactor, the improvement comprising introducing both reactants into said tower and subjecting the same to co-current contact as they progress therethrough.

2. The process of claim 1 wherein carbon monoxide of more than 50% purity is used.

3. The process of claim 1 wherein the sodium hydroxide solution contains 5–50% of sodium formate.

4. The process of claim 1 wherein carbon monoxide is supplied more than 50% in excess over the theoretical amount.

5. The process of claim 1 wherein sodium hydroxide solution is reacted with carbon monoxide at a pressure of about 12–30 $Kg/cm^2$ at a temperature of about 150°–220°C.

6. A process according to claim 5, wherein the carbon monoxide is reacted at a pressure of about 15–20 $Kg/cm^2$ and a temperature of about 170°–220°C.

* * * * *